United States Patent [19]

Kawabata

[11] Patent Number: 5,182,668
[45] Date of Patent: Jan. 26, 1993

[54] OPTICAL BEAM SCANNING SYSTEM HAVING AN IMAGE-FORMING SYSTEM FOR RESHAPING A LIGHT BEAM TO BE APPLIED TO A SCANNING REFLECTOR

[75] Inventor: Motonobu Kawabata, Kyoto, Japan

[73] Assignee: Dainippon Screen Mfg. Co., Ltd., Japan

[21] Appl. No.: 764,143

[22] Filed: Sep. 20, 1991

[30] Foreign Application Priority Data

Sep. 21, 1990 [JP] Japan ............................ 2-253745

[51] Int. Cl.$^5$ .................................... G02B 26/00
[52] U.S. Cl. ..................................... 359/218; 359/205
[58] Field of Search ............... 359/196, 197, 205, 212, 359/216, 217, 218

[56] References Cited

U.S. PATENT DOCUMENTS

| | | | |
|---|---|---|---|
| 4,024,341 | 5/1977 | Takahashi | 358/206 |
| 4,123,135 | 10/1978 | Rabedeau | 359/205 |
| 4,585,296 | 4/1986 | Minoura et al. | 359/205 |
| 4,775,205 | 10/1988 | Muramatsu | 359/205 |
| 5,025,268 | 6/1991 | Arimoto et al. | 359/205 |

Primary Examiner—Robert J. Pascal
Attorney, Agent, or Firm—Ostrolenk, Faber, Gerb & Soffen

[57] ABSTRACT

A first image-forming system includes first and second lens systems which are disposed from a light source to a deflector respectively. The first lens system has a positive power along a second direction so as to converge a diverging light beam from the light source onto the deflector with respect to the second direction. With respect to a first direction being perpendicular to the second direction, the first lens system has zero or a negative power while the second lens system has a positive power so that the focal point of the first image-forming system is located at the light source. Thus, a collimated light beam in the first direction from the first image-forming system is directed to the deflector.

11 Claims, 9 Drawing Sheets

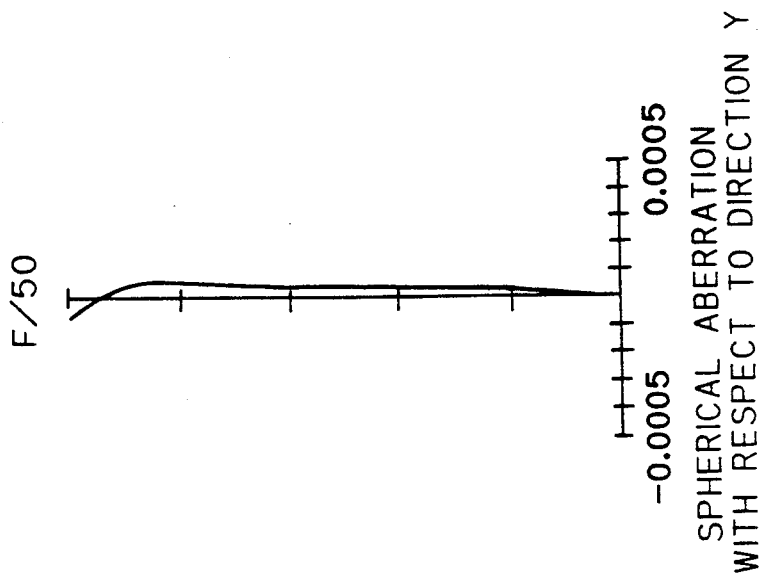
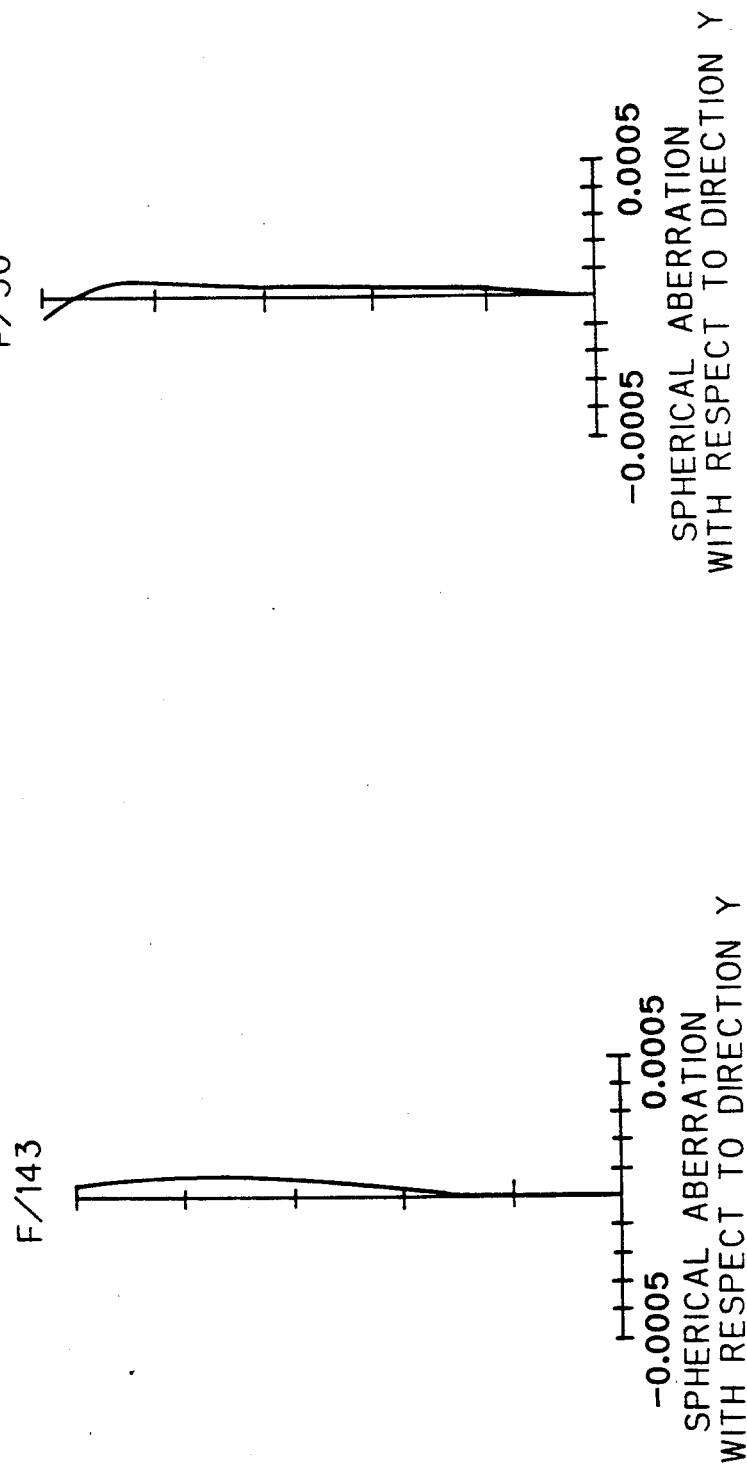

OPTICAL BEAM SCANNING SYSTEM HAVING AN IMAGE-FORMING SYSTEM FOR RESHAPING A LIGHT BEAM TO BE APPLIED TO A SCANNING REFLECTOR

BACKGROUND OF THE INVENTION

1. Field of the Invention

The present invention relates to an optical beam scanning system in which a light beam from a light source is reshaped through a first image-forming system and is then reflected by a rotary polygon mirror, to thereby scan a surface-to-be-scanned through a second image-forming system.

2. Description of the Prior Art

FIG. 1 is a perspective view of a conventional optical beam scanning system. In the conventional optical beam scanning system, as shown in FIG. 1, a light beam $L_1$ from a light source 1 impinges, via a first image-forming system 2, on a rotary polygon mirror 3 which rotates about an axis of rotation $3b$ in a direction A as indicated by an arrow.

The first image-forming system 2 includes a collimating lens 21 and a cylindrical lens 22. The collimating lens 21, as shown in FIG. 2A, is formed by a concave lens $21a$ and a convex lens $21b$ joined to each other. The cylindrical lens 22 has a refracting power only along a direction of the axis of rotation $3b$, that is, a direction Y. Thus, the light beam $L_1$, which deverges from the light source 1 enters the collimating lens 21 where it is collimated to become a collimated beam $L_2$. The collimated beam $L_2$ enters the cylindrical lens 22 to become a converging beam $L_3$ which converges onto a mirror surface $3a$ of the rotary polygon mirror 3 only with respect to the direction Y (FIG. 2A).

The light beam $L_3$ is deflected by the rotary polygon mirror 3 to become a deflected beam $L_4$. The deflected beam $L_4$ is focused on a surface-to-be-scanned 5 through a second image-forming system 4 which is comprised of a scanning lens 41 and a cylindrical lens 42, the cylindrical lens 42 having a refracting power only along the direction of the axis of rotation $3b$ (i.e., direction Y).

For convenience of illustration, FIGS. 2A and 2B illustrate the optical axis of the optical beam scanning system extending along a direction Z even though in reality, the optical axis changes its direction.

In this structured optical system, the mirror surface $3a$ of the rotary polygon mirror 3 and the surface-to-be-scanned 5 are in conjugation with each other with respect to the direction Y as shown in FIG. 2A. As a result, facet errors related to the mirror surface $3a$ are corrected, which in turn guarantee a high quality image recorded on the surface-to-be-scanned 5.

By expanding a diameter $\phi_X$ (FIG. 2B) of the light beam $L_3$ taken in the X direction, the light beam can be focused on the surface-to-be-scanned 5 at a high resolution with respect to the main scanning direction. In other words, excellent focusing is obtainable if the collimated beam $L_2$ from the collimate lens 21 has a large beam diameter $\phi$ ($=\phi_X=\phi_Y$).

As the beam diameter $\phi$ of the light beam $L_2$ increases, the first image-forming system 2 has a longer optical path length. This is because the numerical aperture $NA_p$ (i.e., an angle $\phi_p$) at the rotary polygon mirror 3 side is preliminarily determined by the second image-forming system 4. The fact that the angle $\phi_p$ is preliminarily determined naturally implies that the cylindrical lens 22 must have a longer focal length $f_{22}$ along the direction Y to enlarge the beam diameter $\phi$ of the light beam $L_2$. In addition, the numerical aperture $NA_0$ (i.e., an angle $\phi_0$) at the light source 1 side is constant. This circumstance requires the collimating lens 21 to have a long focal length $f_{21}$ if a larger diameter $\phi$ of the light beam $L_2$ is desired.

Assume that an optical beam scanning system satisfies the following design conditions:

Beam Diameter $\phi$ of Light Beam $L_2 = 19$ mm;

Numerical Aperture $NA_0$ at Light Source Side $= 0.1$; and

Numerical Aperture $NA_p$ at Rotary Polygon Mirror Side $= 0.0035$

In such an optical beam scanning system, the first image-forming system 2 may be designed so as to have lens data as given in Table 1, for example.

TABLE 1

| i | $r_{Xi}$ | $r_{Yi}$ | $d_i$ | $n_i$ |
|---|---------|---------|-------|----------|
| 1 | 319.575 | 319.575 | 1.5 | 1.609089 |
| 2 | 27.71 | 27.71 | 4.0 | 1.582509 |
| 3 | −60.579 | −60.579 | 25.0 | |
| 4 | ∞ | 1337.626 | 3.0 | 1.492821 |
| 5 | ∞ | ∞ | 2727.474 | |

For convenience of description, the disclosure uses the symbol "$r_X$" to refer to a radius of curvature of the light beam taken along the X direction on the optical axis. Likewise, by the symbol "$r_Y$" is denoted a radius of curvature of the light beam taken along the Y direction on the optical axis. In Table 1, the symbols $r_{Xi}$ and $r_{Yi}$ denote radii of curvature of the surfaces of the i-th lens (i=1 to 5) from the light source 1. The symbol $d_i$ is a surface-to-surface distance, taken on the optical axis, between the i-th (i=1 to 4) lens and an (i+1)-th lens from the light source 1. The reference denotes "$d_5$" a distance between the cylindrical lens 22 and the mirror surface $3a$. The symbols $n_1$, $n_2$ and $n_3$ are refractive indices of the concave lens $21a$, the convex lens $21b$ and the cylindrical lens 22 at a wavelength of 780 nm, respectively. Like symbols will adhere to the descriptions hereinafter in explaining other embodiments, and therefore, will not be explained again.

In the first image-forming system 2 having such structure, the focal length $f_{21}$ of the collimating lens 21 and the focal length $f_{22}$ of the cylindrical lens 22 taken along the Y direction are:

$f_{21} = 95$ mm $f_{22} = 2714.284$ mm

The distance $d_0$ between the light source 1 and the object-side surface of the first lens from the light source 1 is:

$d_0 = 91.923$ mm

Therefore, the optical path length d of the first image-forming system 2 is as long as d ≈ 2852 mm.

SUMMARY OF THE INVENTION

The present invention is directed to an optical beam scanning system, comprising: (a) a light source for emitting a diverging light beam; (b) a deflector for deflecting the light beam in a first direction; (c) a first image-forming system for converging the light beam from the light source onto the deflector with respect to a second direction, the second direction being perpendicular to the first direction, the first image-forming system including (c-1) a first lens system disposed between the light source and the deflector, the first lens system having no or a negative power along the first direction and having a positive power along the second direction and (c-2) a second lens system disposed between the first lens system and the deflector, the second lens system having a positive power only along the first direction; and (d) a second image-forming system for focussing the light beam in the first and second directions on a surface to be scanned.

According to an aspect of the present invention, the second lens system is away from the light source so that the focal point of the first image-forming system with respect to the first direction is disposed at the light source.

Accordingly, the object of the present invention is to obtain a small-size optical beam scanning system equipped with a facet-error correction function.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows spherical aberration along a direction Y in a first image-forming system of the optical beam scanning system of FIGS. 4A and 4B;

FIG. 10 shows spherical aberration along the direction Y in a first image-forming system of an optical beam scanning system according to an alternative other embodiment of the present invention.

DESCRIPTION OF THE PREFERRED EMBODIMENTS

In an optical beam scanning system, if it is desirable to precisely focus a light beam onto a surface-to-be-scanned with respect to the main scanning direction X, it is necessary to increase the beam diameter $\phi_X$ taken along the main scanning direction X of a light beam from a first image-forming system. It is equally important to correct polygon facet errors caused in relation to the rotary polygon mirror. The rotary polygon mirror may be arranged so that the mirror surfaces of the rotary polygon mirror are in conjugation with a surface-to-be-scanned 5 with respect to a direction Y which is perpendicular to the main scanning direction X (namely, the direction of the axis of rotation for the rotary polygon mirror).

The present invention enables the optical path length of the first image-forming system 2 to be shortened by reshaping the light beam $L_1$ so that only its beam diameter $\phi_X$ along the X direction is enlarged without increasing its beam diameter $\phi_Y$ along the Y direction (i.e., while having the diameter $\phi_Y$ stay small).

A. First Embodiment

Figure 1:
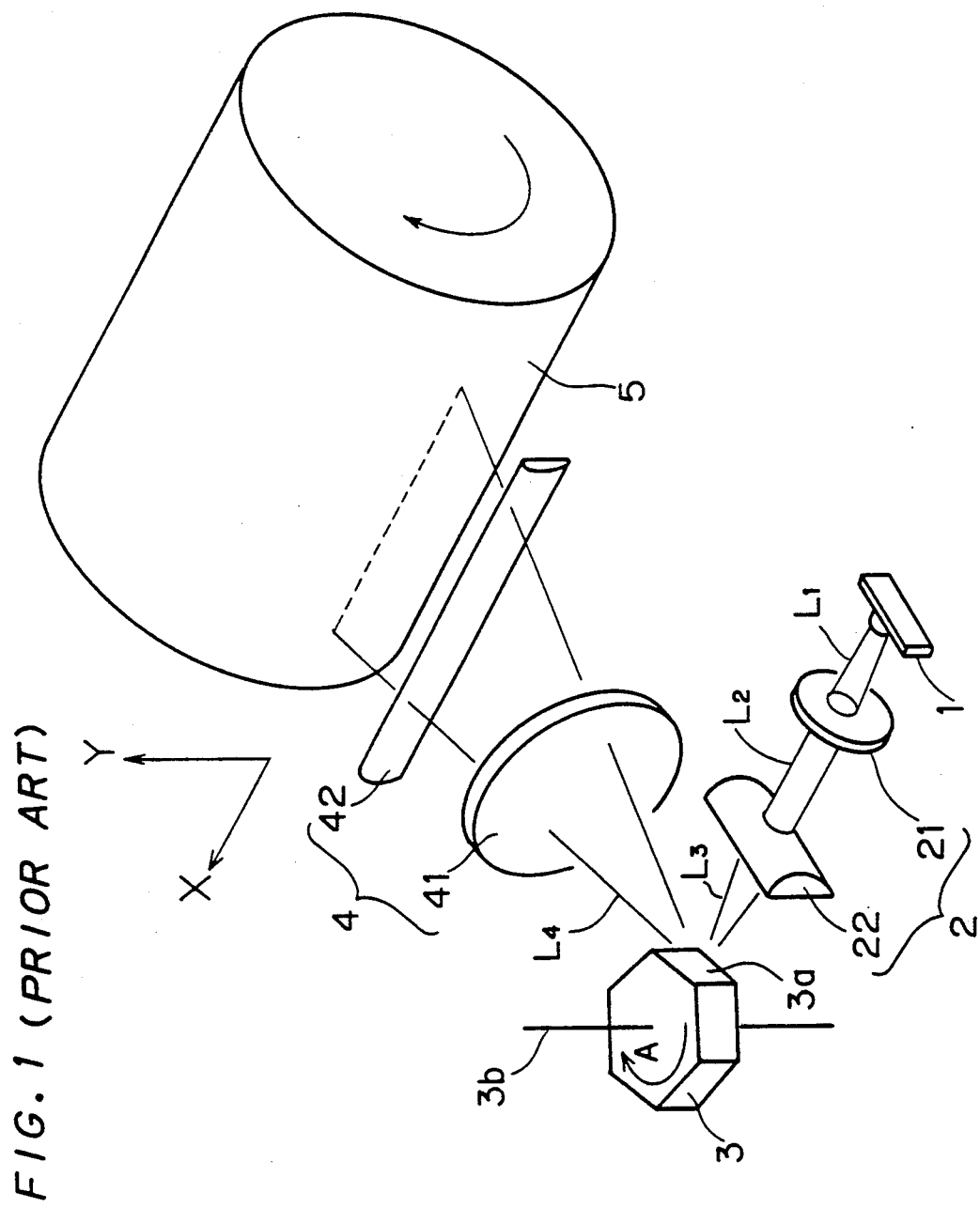
FIG. 1 is a view of a conventional optical beam scanning system.
Figure 2A:
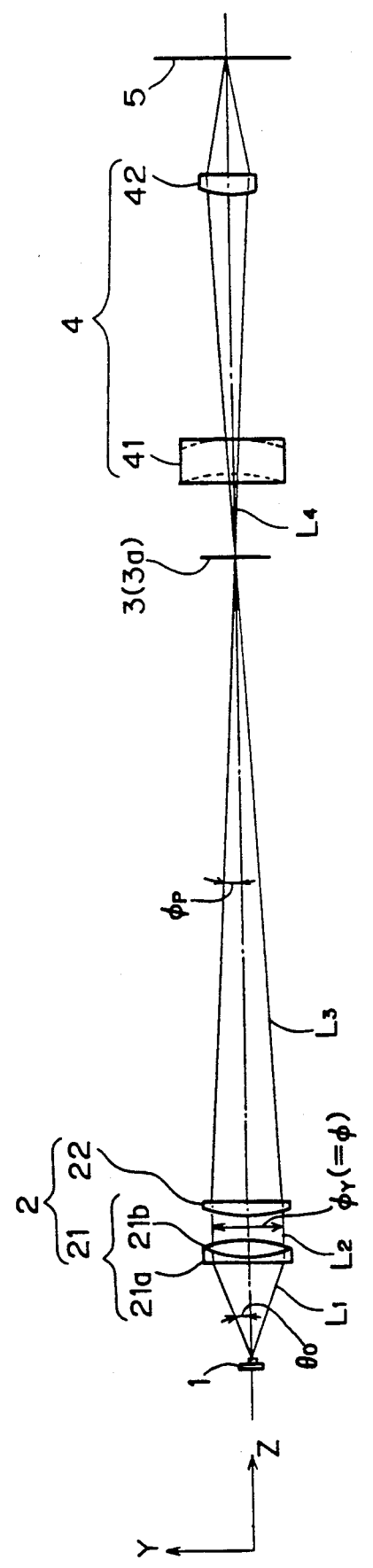
FIGS. 2A and 2B are views of the optical system of the conventional optical beam scanning system taken in a Y-Z plane and an X-Z plane, respectively.
Figure 2B:
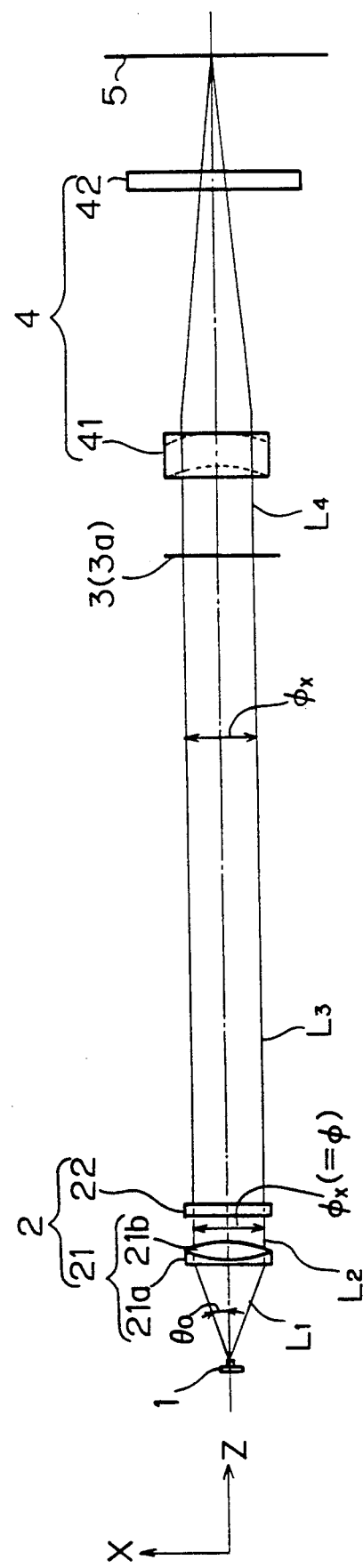
Figure 3:
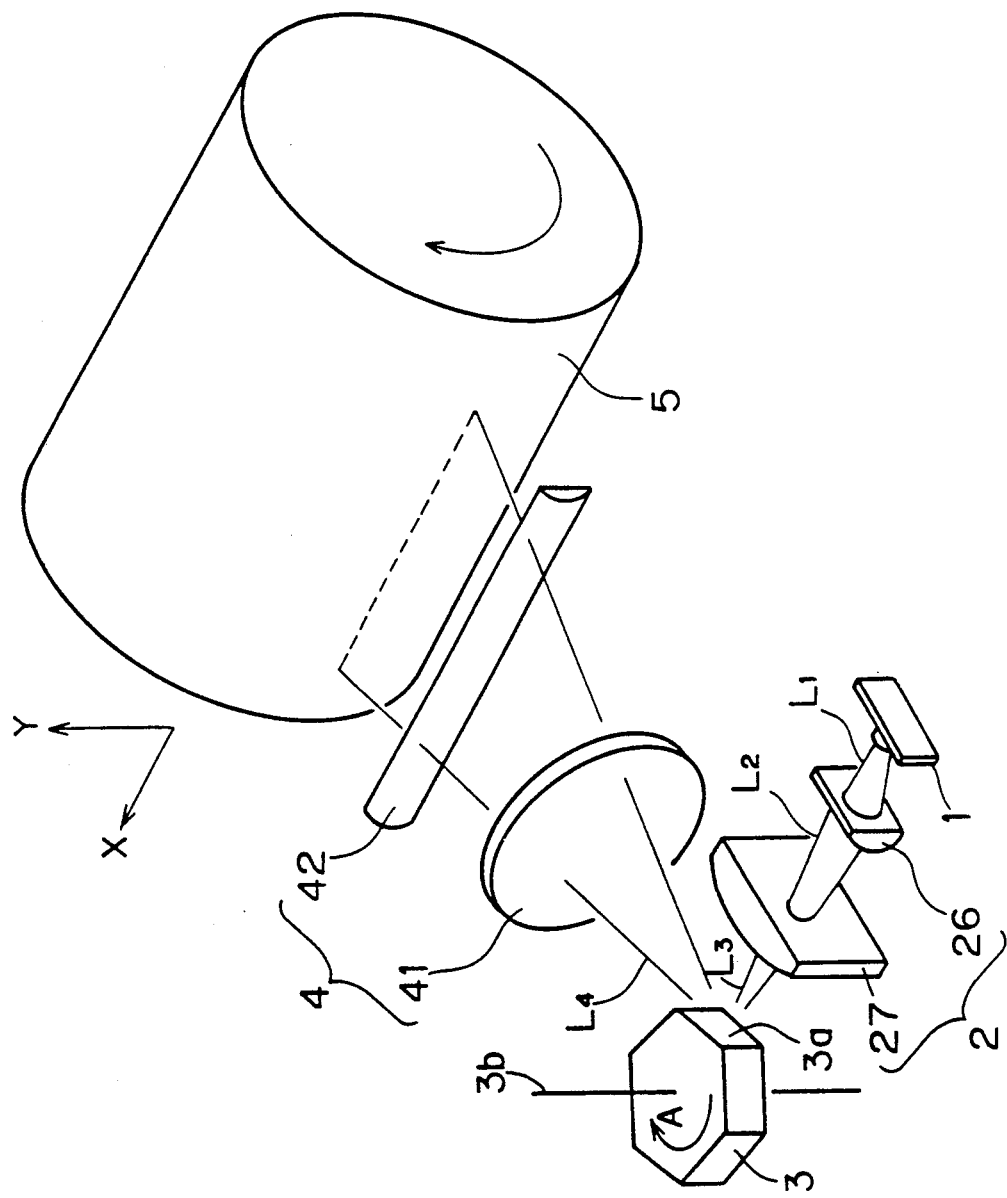
FIG. 3 is a view of an optical beam scanning system according to a first embodiment of the present invention.
Figure 4A:
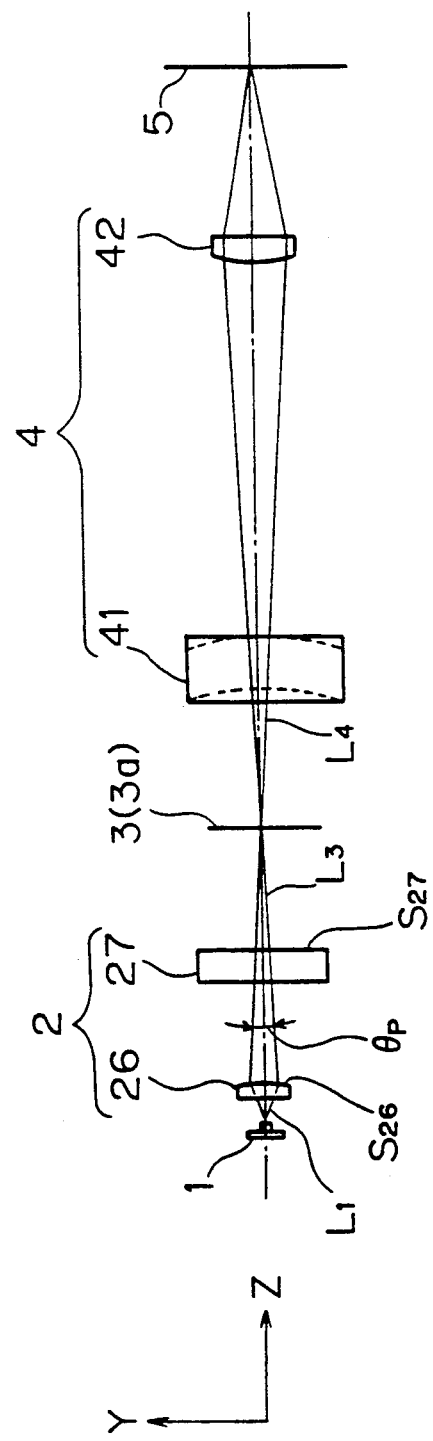
FIGS. 4A and 4B are views of an optical system of the optical beam scanning system taken in a Y-Z plane and an X-Z plane, respectively.
Figure 4B:
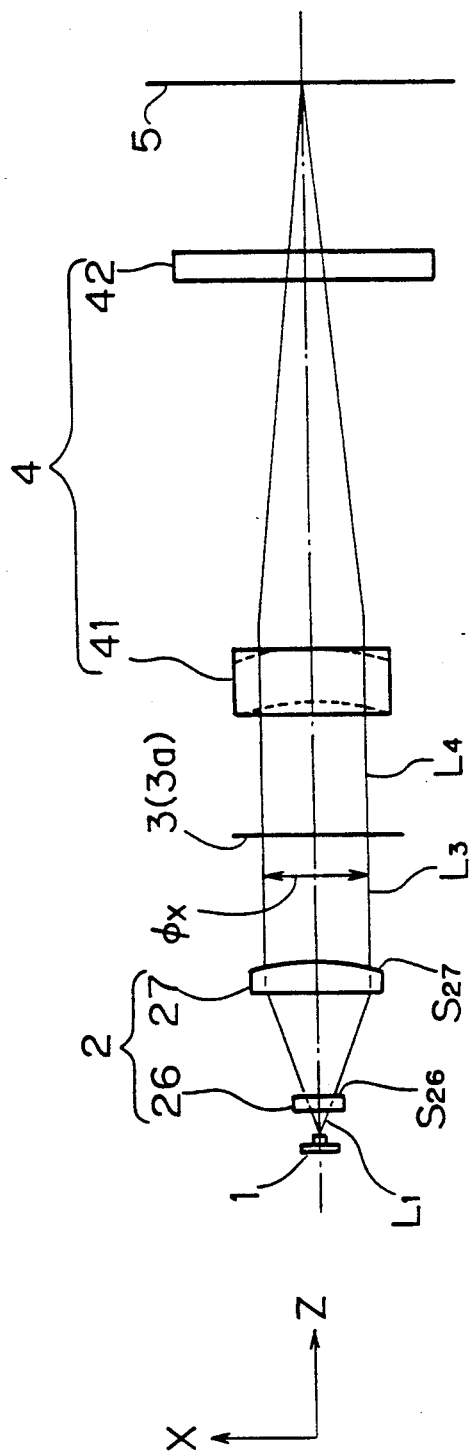

FIG. 3 is a perspective view of an optical beam scanning system according to a first embodiment of the present invention. FIGS. 4A and 4B are views showing an optical system of the optical beam scanning system, taken in a Y-Z plane and an X-Z plane, respectively. As shown in the figures, the optical beam scanning system has the same structure as that of the conventional optical beam scanning system of FIGS. 1, 2A and 2B, except for the structure of the first image-forming system 2. Hence, only the structure of the first image-forming system 2 will be described in detail. The symbols and the reference numbers used in describing the conventional optical beam scanning system are used to indentify parts of the optical beam scanning system of the present invention except for that of the first image-forming system 2.

The first image-forming system 2 includes a first lens system 26 and a second lens system 27. The first lens system 26 is formed by a cylindrical lens which has a positive power along the direction of an axis of rotation $3b$ (Y direction), the second lens system 27 being formed by a cylindrical lens which has a positive power along the main scanning direction X. The first and the second lens systems 26 and 27 are located on the light source 1 side and the rotary polygon mirror 3 side respectively.

A diverging light beam $L_1$ from the light source 1 first enters the first lens system 26 where it is reshaped so as to converge onto a mirror surface $3a$ at a predetermined angle of $\theta_p$ (FIG. 4A) with respect to the Y direction. (The numerical aperture at the light source side is $NA_0$ (i.e., divergence angle being $\theta_o$) though not shown in FIGS. 4A and 4B). With respect to the X direction, on the other hand, the light beam passes through the first lens system 26 and diverges at an angle of $\theta_o$, since the first lens system 26 has no power along the X direction.

The light beam from the first lens system 26 next enters a second lens system 27. The light beam, generally referred to as $L_3$, passes through the second lens system 27, and becomes a converging light converging onto the mirror surface $3a$ of the rotary polygon mirror 3 at an angle of $\theta_p$, since the second lens system 27 has no power along the Y direction. With respect to the X direction on the other hand, the light beam $L_3$ is reshaped by the second lens system 27 into a collimated light beam.

The reshaped light beam $L_3$ is thereafter deflected by the rotary polygon mirror 3 becoming a deflected light beam $L_4$ which would be focused on the surface-to-be-scanned 5 through a second image-forming system 4 which is formed by a scanning lens 41 and a cylindrical lens 42.

As described above, in the first image-forming system 2 according to the first embodiment, the diverging beam $L_1$ is not reshaped into a collimated beam in which the relation $\phi_X = \phi_Y$ is satisfied, but is reshaped by the first lens system 26 into a converging light beam converging onto the mirror surface 3a at a predetermined angle $\theta_p$ only along the Y direction. Thus, with respect to the Y direction, the light beam $L_3$ can be focused on the mirror surface 3a, independently of how large the beam diameter $\phi_X$ of the light beam $L_3$ for the X direction is. For example, the first lens system 26 can be disposed in the vicinity of the light source 1 as shown in FIG. 4A. The nearer the first lens system 26 is to the light source 1, the shorter the distance between the first lens system 26 and the rotary polygon mirror 3.

On the other hand, since the light beam $L_3$ must have beam diameter $\phi_X$ (which is taken along the X direction) of a predetermined size, the second lens system 27 must be remote from the light source 1 by a distance corresponding to the beam diameter $\phi_X$. More particularly the second lens system 27 must be a distance from the light source 1 by a distance equivalent to its focal length. Hence, it is not possible for the first image-forming system 2 to have an optical path length which is shorter than the focal length of the second lens system 27. However, this conversely implies that, according to the first embodiment, the optical path length of the first image-forming system 2 can be reduced to as short as the focal length of the second lens system 27.

Now, it will be explained to what extent the optical path length of the first image-forming system 2 can be shortened. To this end, a comparison will be made between the conventional optical beam scanning system (Table 1) and the optical beam scanning system of the first embodiment which satisfies exactly the same design conditions as those for the conventional optical beam scanning system.

The optical beam scanning system according to the first embodiment includes a first lens system 26 formed by an aspherical cylindrical lens, which would reduce aberrations, especially spherical aberration. That is, in the first lens system 26, a surface $S_{26}$ facing toward a rotary polygon mirror 3 satisfies Eq. 1 below.

$$z = \frac{c_y \cdot y^2}{1 + \sqrt{1 - (1 + k) c_y^2 \cdot y^2}} \quad (1)$$

Where the symbols x, y and z represent distances along directions X, Y and Z from an origin, the origin being an intersection at which the surface $S_{26}$ and the optical axis of the scanning system intersect, and $c_y$ ... inverse number of the radius of curvature $r_y$ of the surface $S_{26}$ taken along the Y direction, k ... coefficient of the aspherical surface.

Similarly, the second lens system 27 has a surface $S_{27}$ facing toward the rotary polygon mirror 3 which satisfies:

$$z = \frac{c_x \cdot x^2}{1 + \sqrt{1 - (1 + k) c_x^2 \cdot x^2}} \quad (2)$$

where the symbols x, y and z represent distances taken along directions X, Y and Z from an origin, the origin being an intersection at which the surface $S_{27}$ and the optical axis of the scanning system intersect, and $c_x$ ... inverse number of the radius of curvature $r_x$ of the surface $S_{27}$ taken along the X direction, k ... coefficient of the aspherical surface.

Table 2 shows lens data of the first image-forming system 2 according to the first embodiment.

TABLE 2

| i | $r_{Xi}$ | $r_{Yi}$ | $d_i$ | $n_i$ | k |
|---|---|---|---|---|---|
| 1 | ∞ | 6.442 | 2.0 | 1.492821 | |
| 2 | ∞ | −2.477 | 87.681 | | −0.995 |
| 3 | 401.492 | ∞ | 5.0 | 1.492821 | |
| 4 | −52.780 | ∞ | 23.904 | | −0.760 |

FIG. 5 shows spherical aberration of the first image-forming system 2 having the lens data above, with respect to the direction Y.

In such a first image-forming system 2, the focal length $f_{26Y}$ of the first lens system (cylindrical lens) 26 taken along the direction Y and the focal length $f_{27X}$ of the second lens system (cylindrical lens) 27 taken along the direction X are:

$f_{26Y} = 3.921$ mm $f_{27X} = 95$ mm

The distance $d_0$ between the light source 1 and the object-side surface of the first lens 26 is:

$d_0 = 3.013$ mm

Therefore, the optical path length d of the first image-forming system 2 is drastically reduced to:

$d_0 \approx 122$ mm and, is thus, much shorter than that of the conventional optical beam scanning system (d = 2852 mm).

Although the optical beam scanning system according to the first embodiment requires the surface $S_{26}$ of the first lens system 26 to be aspherical, the surface $S_{26}$ may be simply cylindrical. However, considering correction of aberrations such as spherical aberration, the surface $S_{26}$ is preferably aspherical. Still another modification is possible wherein both surfaces of the first lens system 26 are aspherical. The modifications as above are applicable not only to the first lens system 26 but also to the second lens system 27.

B. Second Embodiment

Figure 6A:
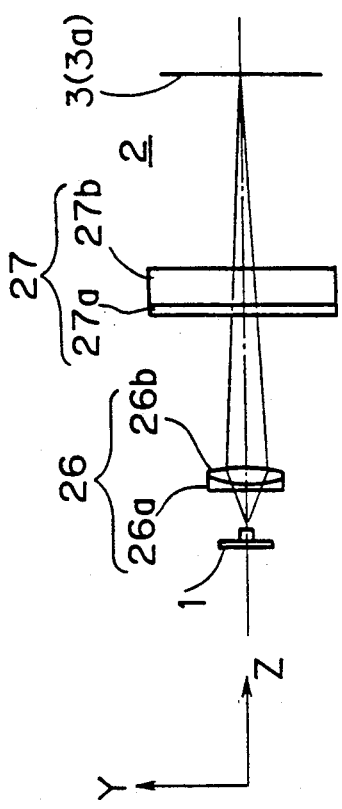
FIGS. 6A and 6B are views of a first image-forming system of an optical beam scanning system according to a second embodiment of the present invention.
Figure 6B:
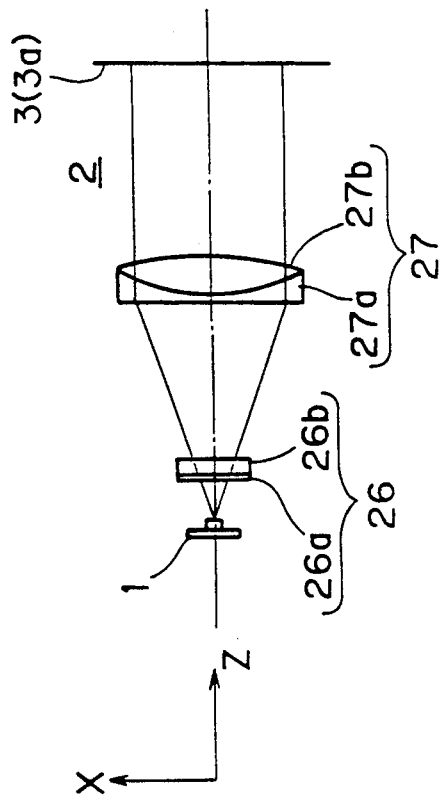

The first lens system 26 and/or the second lens system 27 may be formed by a plurality of lenses rather than the single lens shown in the first embodiment. For example, a first and a second lens system 26 and 27 shown in FIGS. 6A and 6B are also possible. In FIGS. 6A and 6B, two lenses 26a and 26b joined to each other form a cylindrical lens (first lens system) 26 which has a positive power along the direction Y (i.e., the direction of axis of rotation of the rotary polygon moirror). Likewise, two lenses 27a and 27b joined to each other form a cylindrical lens (second lens system) 27 which has positive power only along the main scanning direction X. The same effect as recited in relation to the first embodiment is obtainable with the first and the second lens systems 26 and 27 according to the second embodiment.

Now, explanation will be given on advantages of an optical beam scanning system according to a second embodiment, which satisfies the same design conditions as those for the conventional optical beam scanning system, by comparing it with the conventional optical beam scanning system (Table 1).

Table 3 gives lens data of a first image-forming system 2 of the optical beam scanning system according to the second embodiment.

TABLE 3

| i | $r_{Xi}$ | $r_{Yi}$ | $d_i$ | $n_i$ |
|---|---|---|---|---|
| 1 | ∞ | ∞ | 1.0 | 1.609089 |
| 2 | ∞ | 0.695 | 2.0 | 1.582509 |
| 3 | ∞ | −2.082 | 87.993 | |
| 4 | 319.575 | ∞ | 1.5 | 1.609089 |
| 5 | 27.71 | ∞ | 4.0 | 1.582509 |
| 6 | −60.579 | ∞ | 23.457 | |

Figure 7:
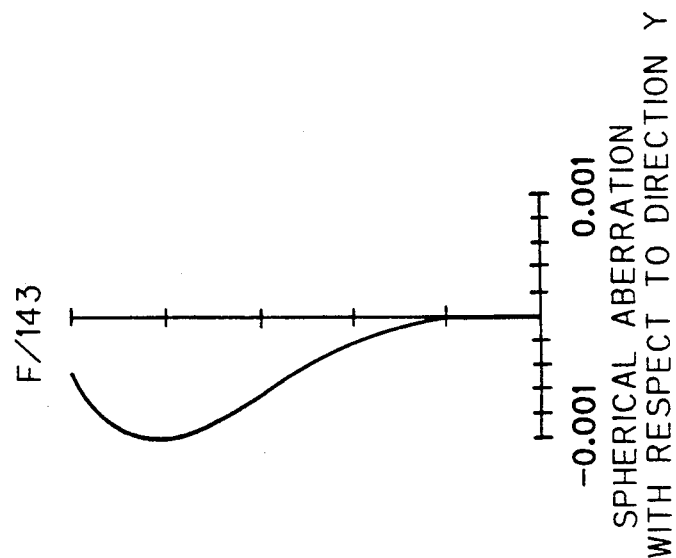
FIG. 7 shows spherical aberration along the direction Y in the first image-forming system of FIGS. 6A and 6B.

FIG. 7 shows Y-direction spherical aberration of the first image-forming system 2 having the lens data above.

In such a first image-forming system 2, the focal length $f_{26Y}$ of the cylindrical lens (first lens system) 26 taken along the direction Y and the focal length $f_{27X}$ of the cylindrical lens (second lens system) 27 taken along the direction X are:

$f_{26Y} = 3.921$ mm $f_{27X} = 95$ mm

The distance $d_0$ between the light source 1 and the object-side surface of the first lens system 26 is:

$d_0 = 2.051$ mm

Therefore, the optical path length d of the first image-forming system 2 is reduced to:

$d_0 \approx 122$ mm and, is thus, quite shorter than that of the conventional optical beam scanning system (d=2852 mm).

C. Third Embodiment

Figure 8A:
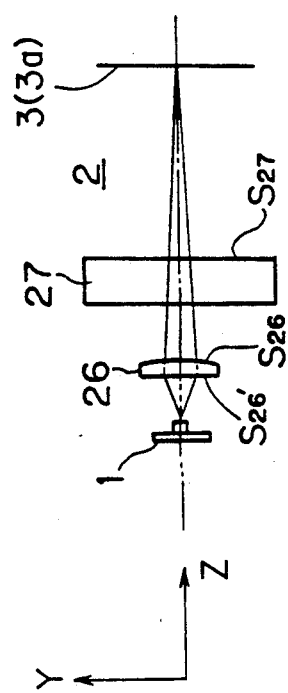
FIGS. 8A and 8B are views of a first image-forming system of an optical beam scanning system according to a third embodiment of the present invention.
Figure 8B:
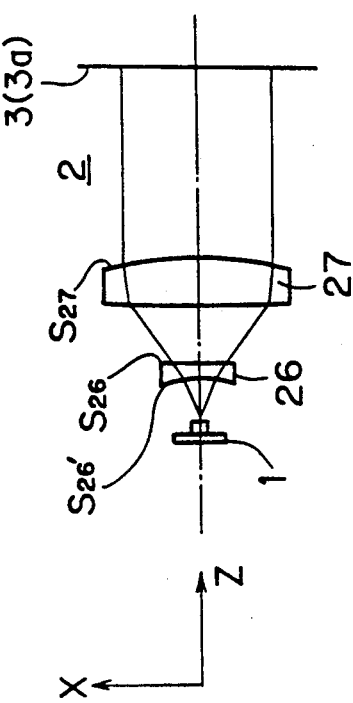

FIGS. 8A and 8B show a first image-forming system 2 of an optical beam scanning system according to a third embodiment of the present invention. The first image-forming system 2 includes a first lens system 26 formed by a toroidal lens and a second lens system 27 formed by a cylindrical lens. The toroidal lens forming the first lens system 26 has a positive power along the Y direction (direction of the axis of rotation) and has a negative power along the main scanning direction X. The cylindrical lens forming the second lens system 27 has a positive power along the main scanning direction X. The first and the second lens systems 26 and 27 are disposed from a light source 1 side to a rotary polygon mirror 3 side respectively. In the first lens system (toroidal lens) 26, a surface $S_{26}'$ facing toward the light source 1 is toroidal, whereas a surface $S_{26}$ facing toward a mirror surface 3a of the rotary polygon mirror 3 is aspherical. In the second lens system (cylindrical lens) 27, a surface $S_{27}$ facing toward the mirror surface 3a is aspherical. The surfaces $S_{26}$ and $S_{27}$ must not always be aspherical, but may simply be cylindrical. However, the surfaces $S_{26}$ and $S_{27}$ are preferred to be aspherical in order to reduce aberrations such as spherical aberration.

The third embodiment has a large difference from the first embodiment in that the first lens system 26 has a positive power along the direction Y (direction of the axis of rotation) as well as a negative power along the main scanning direction X. Hence, not only can the desired effect of the first embodiment be achieved, but also the advantage of a reduced distance between the light source 1 and the second lens system 27 can be attained. The latter is possible because the first lens system has a negative power along the main scanning direction. The focal length of a composite lens system consisting of the first and the second lens system is equal to that of the first and the second embodiment. Thus, according to the third embodiment, the first image-forming system 2 has a reduced optical path length compared to the first and the second embodiment, without altering the numerical aperture from the light source, which eventually enables downsizing in the optical beam scanning system.

Next, the extent the optical path length can be shortened accoding to the third embodiment will be examined. For this purpose, the optical beam scanning system of the third embodiment which satisfies the demands above will be explained, followed by an explanation about what effects such optical beam scanning system would offer.

In the optical beam scanning system according to the third embodiment, the first and the second lens systems 26 and 27 have surfaces $S_{26}$ and $S_{27}$, respectively, each being aspherical as in the first embodiment.

Table 4 below gives lens data of a first image-forming system 2 according to the third embodiment.

TABLE 4

| i | $r_{Xi}$ | $r_{Yi}$ | $d_i$ | $n_i$ | k |
|---|---|---|---|---|---|
| 1 | −1.077 | 4.575 | 1.0 | 1.492821 | |
| 2 | ∞ | −1.664 | 42.807 | | −1.06 |
| 3 | 178.343 | ∞ | 5.0 | 1.492821 | |
| 4 | −26.696 | ∞ | 27.686 | | −0.782 |

Figure 9:
FIG. 9 shows spherical aberration along the direction Y in the first image-forming system of FIGS. 8A and 8B.

FIG. 9 shows spherical aberration of the first image-forming system 2 whose lens data is given in Table 4, with respect to the direction Y.

In the first image-forming system 2 as above, the focal lengths $f_{26X}$ and $f_{26Y}$ of the first lens system (toroidal lens) 26 taken along the directions X and Y, respectively, and the focal length $f_{27X}$ of the second lens system (cylindrical lens) 27 taken along the direction X are:

$f_{26X} = -2.185$ mm $f_{26Y} = 2.614$ mm $f_{27X} = 47.5$ mm

The distance $d_0$ between a light source 1 and the object-side surface of the first lens system is:

$d_0 = 2.187$ mm

Hence, the optical path length d of the first image-forming system 2 is largely reduced to:

$d \approx 79$ mm and, is thus, much shorter than that of the conventional optical beam scanning system (d=2852 mm) and that of the optical beam scanning systems according to the first and the second embodiment (d=122 mm).

D. Other Embodiment

The preceding descriptive portion is devoted to explanations on the first image-forming systems 2 of the optical beam scanning system which satisfies:

Beam Diameter $\phi$ of Light Beam $L_2 = 19$ mm;
Numerical Aperture $NA_0$ at Light Source Side = 0.1; and Numerical Aperture $NA_p$ at Rotary Polygon Mirror Side = 0.0035

However, it is appreciated that the present invention is not exclusively directed to the optical beam scanning system with such design. The present invention is adaptable to an optical beam scanning system of another design as given below, for instance.

Beam Diameter $\phi$ of Light Beam $L_2 = 30$ mm;
Numerical Aperture $NA_0$ at Light Source Side = 0.4; and
Numerical Aperture $NA_p$ at Rotary Polygon Mirror Side = 0.01

The present invention, when applied to an optical beam scanning system which satisfies these conditions, promises similar effects to those accomplished according to the first through the third embodiments.

In such an optical beam scanning system, a first image-forming system 2 may be exactly the same in structure as the first image-forming system 2 of the first embodiment (FIGS. 4A and 4B). However, the demand for reduction in spherical aberration requires that each surface of a first lens system 26 satisfies Eq. 3 below.

$$z = \frac{c_y \cdot y^2}{1 + \sqrt{1 - (1 + k) c_y^2 \cdot y^2}} + Ay^4 + By^6 \quad (3)$$

Where the symbols x, y and z represent distances along directions X, Y and Z from an origin, the origin being an intersection at which each surface of the first lens system 26 and the optical axis of the scanning system intersect, and $c_y$ ... inverse number of the radius of curvature $r_Y$ of each surface taken along the Y direction, k, A, B ... coefficient of the aspherical surface.

Likewise, each surface of a second lens system 27 must satisfy:

$$z = \frac{c_x \cdot x^2}{1 + \sqrt{1 - (1 + k) c_x^2 \cdot x^2}} + Ax^4 \quad (4)$$

where the symbols x, y and z represent distances taken along directions X, Y and Z from an origin, the origin being an intersection at which each surface the second lens 27 and the optical axis of the scanning system intersect, and $c_x$ ... inverse number of the radius of curvature $r_X$ of each surface taken along the X direction, k, A ... coefficient of the aspherical surface.

Table 5 shows lens data of the first image-forming system 2 as above.

TABLE 5

| i | $r_{Xi}$ | $r_{Yi}$ | $d_i$ | $n_i$ | k | A | B |
|---|---|---|---|---|---|---|---|
| 1 | ∞ | 8.987 | 2.0 | 1.492821 | −15.379 | −2.088 × 10⁻³ | 6.954 × 10⁻⁵ |
| 2 | ∞ | −2.373 | 27.255 | | −0.550 | 8.958 × 10⁻⁴ | 7.026 × 10⁻⁵ |
| 3 | 128.172 | ∞ | 10.0 | 1.492821 | −66.196 | −6.140 × 10⁻⁷ | |
| 4 | −21.038 | ∞ | 130.049 | | −0.644 | 0.107 × 10⁻⁶ | |

FIG. 10 shows spherical aberration of the first image-forming system 2 having the lens data above, with respect to the direction Y.

In the first image-forming system 2 as above, the focal length $f_{26Y}$ of the first lens system (cylindrical lens) 26 taken along the direction Y, and the focal length $f_{27X}$ of the second lens system (cylindrical lens) 27 taken along the direction X are:

$f_{26Y} = 4.045$ mm $f_{27X} = 37.5$ mm

The distance $d_0$ between a light source 1 and the object-side surface of the first lens system 26 is:

$d_0 = 3.022$ mm

Hence, the optical path length d of the first image-forming system 2 is reduced to:

$d = 172$ mm

Thus, a relatively short optical path length d is attained.

While the invention has been described in detail in relation to only a few embodiments, the foregoing description is in all aspects illustrative and not restrictive. It is understood that numerous other modifications and variations can be devised without departing from the scope of the invention.

What is claimed is:

1. An optical beam scanning system, comprising:
   (a) a light source for emitting a diverging light beam;
   (b) a deflector for deflecting said light beam in a first direction;
   (c) a first image-forming system for converging said light beam from said light source onto said deflector with respect to a second direction, said second direction being perpendicular to said first direction, said first image-forming system consisting essentially of a first lens system disposed between said light source and said deflector, said first lens system having zero or a negative power along said first direction and having a positive power along said second direction, and a second lens system disposed between said first lens system and said deflector, said second lens system having a positive power only along said first direction; and
   (d) a second image forming system for focussing said light beam in said first and second directions on a surface to be scanned.

2. An optical beam scanning system of claim 1, wherein said second lens system is disposed away from said light source so that a focal point of said first image-forming system with respect to said first direction is disposed at said light source.

3. An optical beam scanning system of claim 2, wherein said second lens system is formed by an aspherical lens.

4. An optical beam scanning system of claim 3, wherein said aspherical lens has a surface facing toward said deflector, said surface satisfying the following equation:

$$z = \frac{c_x \cdot x^2}{1 + \sqrt{1 - (1 + k) c_x^2 \cdot x^2}} + Ax^4$$

where symbols x, y and z represent distances along said first, second and third direction from an origin, respectively, the origin being an intersection at which said surface and an optical axis of said first image-forming system cross each other, said third direction being perpendicular to both said first and second directions, symbol $c_x$ represents an inverse number of the radius of curvature of said surface taken along said first direction and symbols k and A are coefficients of the aspherical surface.

5. An optical beam scanning system of claim 2, wherein said second lens system is formed by a cylindrical lens.

6. An optical beam scanning system of claim 1, wherein said first lens system is formed by an aspherical lens.

7. An optical beam scanning system of claim 6, wherein said aspherical lens has a surface facing toward said deflector, said surface satisfying the following equation:

$$z = \frac{c_y \cdot y^2}{1 + \sqrt{1 - (1 + k) c_y^2 \cdot y^2}} + Ay^4 + By^6$$

where symbols x, y and z represent distances along said first, second and third direction from an origin, respectively, the origin being an intersection at which said surface and an optical axis of said first image-forming system cross each other, said third direction being perpendicular to both said first and second directions, symbol $c_y$ represents an inverse number of the radius of curvature of said surface taken along said second direction and symbols k, A and B are coefficients of the aspherical surface.

8. An optical beam scanning system, comprising:
(a) a light source for emitting a diverging light beam;
(b) a deflector for deflecting said light beam in a first direction;
(c) a first image-forming system for converging said light beam from said light source onto said deflector with respect to a second direction, said second direction being perpendicular to said first direction, said first image-forming system including a first lens system disposed between said light source and said deflector, said first lens system having zero or a negative power along said first direction and having a positive power along said second direction, and a second lens system disposed between said first lens system and said deflector, said second lens system having a positive power only along said first direction; and
(d) a second image forming system for focussing said light beam in said first and second directions on a surface to be scanned;
wherein said second lens system is disposed away from said light source so that a focal point of said first image-forming system with respect to said first direction is disposed at said light source; and
wherein said second lens system is formed by a plurality of lenses which are joined to each other.

9. An optical beam scanning system, comprising:
(a) a light source for emitting a diverging light beam;
(b) a deflector for deflecting said light beam in a first direction;
(c) a first image-forming system for converging said light beam from said light source onto said deflector with respect to a second direction, said second direction being perpendicular to said first direction, said first image-forming system including a first lens system disposed between said light source and said deflector, said first lens system having zero or a negative power along said first direction and having a positive power along said second direction, and a second lens system disposed between said first lens system and said deflector, said second lens system having a positive power only along said first direction; and
(d) a second image forming system for focussing said light beam in said first and second directions on a surface to be scanned;
wherein said first lens system is formed by an aspherical lens; and
wherein said first lens system is formed by a plurality of lenses which are joined to each other.

10. An optical beam scanning system, comprising:
(a) a light source for emitting a diverging light beam;
(b) a deflector for deflecting said light beam in a first direction;
(c) a first image-forming system for converging said light beam from said light source onto said deflector with respect to a second direction, said second direction being perpendicular to said first direction, said first image-forming system including a first lens system disposed between said light source and said deflector, said first lens system having zero or a negative power along said first direction and having a positive power along said second direction, and a second lens system disposed between said first lens system and said deflector, said second lens system having a positive power only along said first direction; and
(d) a second image forming system for focussing said light beam in said first and second directions on a surface to be scanned;
wherein said first lens system is formed by a toroidal lens.

11. An optical beam scanning system of claim 10, wherein said first lens system has a toroidal surface facing toward said light source and an aspherical surface facing toward said deflector.

* * * * *